Nov. 6, 1934.  A. L. TOBIN  1,979,779
TEMPERATURE LIMITING MECHANISM FOR HOT WATER SYSTEMS
Filed April 10, 1934  2 Sheets-Sheet 1

*Arthur Little Tobin*
INVENTOR.

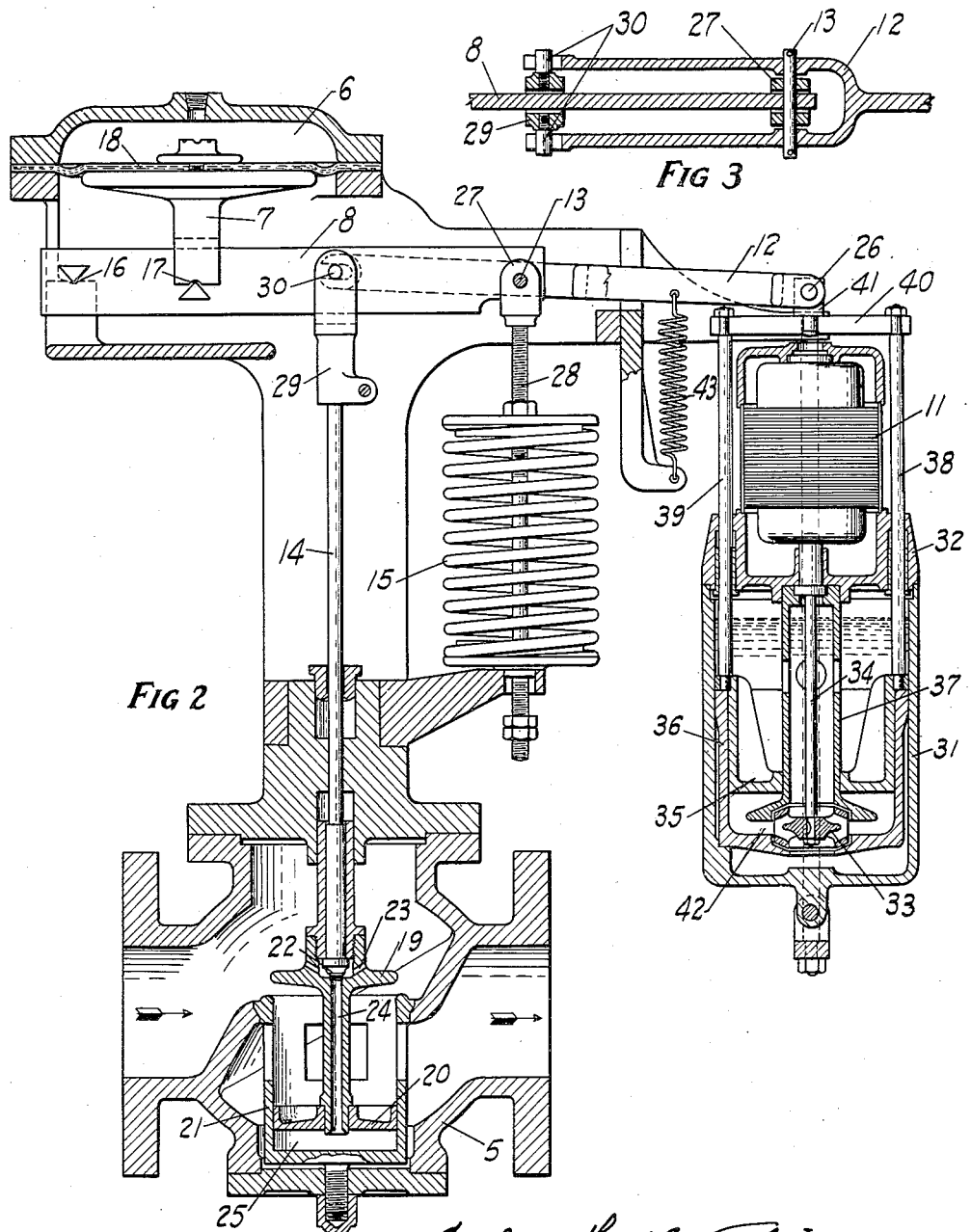

Patented Nov. 6, 1934

1,979,779

UNITED STATES PATENT OFFICE 1,979,779

TEMPERATURE LIMITING MECHANISM FOR HOT WATER SYSTEMS

Arthur Little Tobin, Lynnfield Center, Mass., assignor to Ruggles-Klingemann Mfg. Co., Salem, Mass.

Application April 10, 1934, Serial No. 719,914

11 Claims. (Cl. 236—92)

My invention relates to temperature limiting mechanism for hot water systems, in which steam or other heating media is supplied at a reduced pressure necessary under normal requirements to maintain the desired temperature.

More specifically, my invention comprises a pressure controlling valve, operated from a pressure responsive device, the arrangement being such that the pressure responsive device normally controls the controlling valve to control the pressure, but is rendered inoperative to further control the valve on a pre-determined rise of the temperature in the hot water system.

One of the objects of the invention is to provide a simple and reliable self-contained unit, in which the dual control of both the pressure and the temperature can be effected and thus avoid the expensive necessity of installing two separate valves to accomplish this purpose.

One embodiment of my invention is illustrated more or less diagrammatically in Fig. 1, in which the invention is illustrated in connection with a storage type of hot water heater.

Fig. 2 shows a vertical elevation of this principal apparatus for carrying out the objects of my invention, parts being shown in section.

Fig. 3 shows a detail of the floating lever arrangement for joint control from both pressure and temperature. Like numerals refer to similar parts in the several figures.

Figure 1:
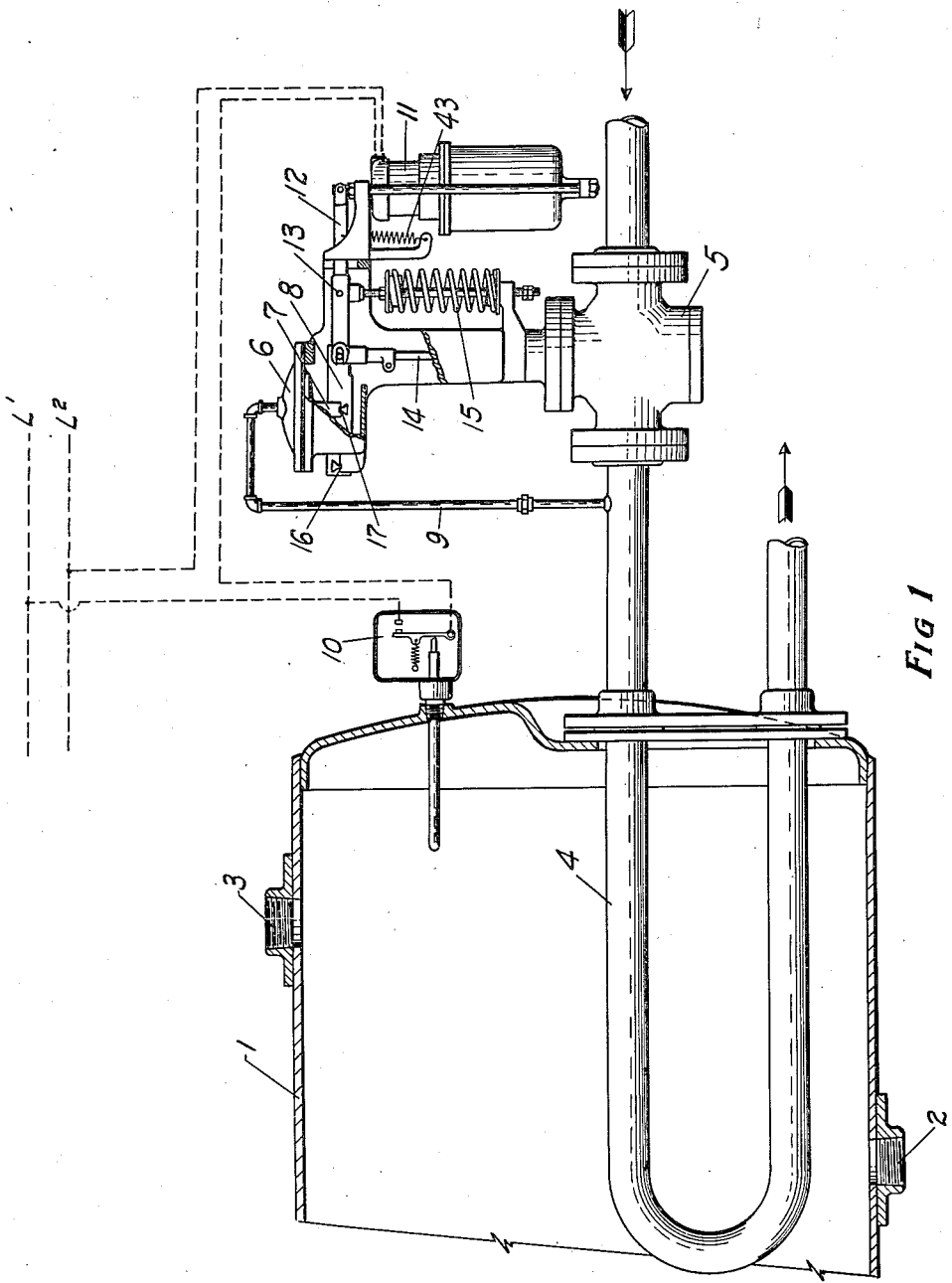

Referring now to Fig. 1, a heater shell (1) has an inlet for cold water at (2) and an outlet for hot water at (3), a bent tube (4) supplies steam to heat the water in the shell. A valve (5) is installed in the pipe line which supplies steam to the heating element. A pressure sensitive device, comprising diaphragm chamber (6), pressure cup (7) and beam (8), normally control the operation of valve (5) due to pressure variations transmitted through pressure connection (9) to maintain a reduced pressure in the heating element, a thermostatically operated switch (10) controls the starting and stopping of motor (11). This motor (11) is arranged to operate a floating lever (12) pivoted on the pressure device arm (8) at point (13), which acts as a fulcrum point in the operation of valve stem (14) from the motor (11), a spring (15) counteracts the pressure in the diaphragm chamber (6).

Now, referring to Figs. 2 and 3, for a more detailed description of the joint operation of the controlling valve from the pressure device and from the motor. Pressure device arm (8) is fulcrumed at (16) and is engaged by pressure cap (7) at point (17), a flexible diaphragm (18) transmits variations in pressure in the diaphragm chamber (6) to the arm (8), which downward movement is resisted by spring (15). The above constitutes a pressure sensation device which is responsive to the steam pressure delivered to the heater to control the controlling valve (5) through the operation of the floating lever (12). Valve (5) shows one type of balanced pressure valve which is easily operated from a pressure sensitive device shown, although other types of balanced pressure valve may be used without departing from the scope of the invention. In the type of valve shown, a valve disc (19) is balanced by a piston (20) operating in cylinder (21). The first upward movement of valve stem (14) unseats pilot valve (22) and admits pressure through port (23) and conduit (24) to cylinder chamber (25). This balances the pressure on valve disc (19) after which the valve may be freely operated. At the final closing movement of the valve disc (19), the pilot valve is closed, which insures a tight, closing valve.

In the operation of my preferred embodiment of a reducing pressure valve, I employ what is, in effect, a compound lever, the arm (8) of the pressure device operating the floating lever (12). Under normal operation in maintaining a pre-determined reduced pressure to the heater of a valve sufficient to maintain the required temperature of the water in the hot water system, the device operated by motor (11), in the position shown in Fig. 2 with the floating lever (12) pivoted at (26) on the motor operated device, acts as a pivot point, and any variations of steam pressure in chamber (6) operates flexible diaphragm (18) and arm (8) to oscillate or reciprocate the lever (12) on this pivot (26).

It will be noted that the pivot pin (13)—reference being had to Fig. 3— passes through both the lever (12) and arm (8), thus indicating the point from which the pressure sensitive device reciprocates the lever (12). It will also be seen that at this point the compression spring (15) is attached to the same pivot pin (13) through clevis (27) and rod (28), which provides the necessary resilient force to balance the pressure in chamber (6). At this point the lever is forked to straddle the spring clevis (27) and arm (8) and extends to the left where it connects to valve stem clevis (29) and is forked or slotted at the end position to engage studs secured to the valve stem clevis (29).

I will now describe the operation of the motor operated device for operating the floating lever (12) independent of the pressure sensitive device.

The motor operated device disclosed is what is known as a hydraulic operator or thrustor, and for a more detailed description than what is required here, reference should be had to patent of William J. Woods, No. 1,901,620 of March 14th, 1933. In the construction of this device a casing (31) is provided with a cover (32) which supports the motor (11), which drives impeller (33) by means of the shaft (34). The piston (35) slides within the sleeve (36) and an opening therein through which the oil tube (37) extends. Supported by the piston (35) are the push rods (38) and (39), having a bridging member (40) supporting a works engaging eye (41). This eye is pivoted on the floating lever (12) with pivot pin (26).

The operation is as follows: When the motor (11) is energized, the impeller (33) will rotate. The impeller forces oil in the casing in a radial direction through the passageway (42), thus creating a pressure differential between opposite sides of the piston (35) to move it upward in a vertical direction. When the motor is de-energized the pressure under the piston (35) is dissipated back through the impeller, and spring (43) attached to the floating lever (12) returns the piston to its initial biased position.

It will now be seen that the operation of this motor driven device will operate the controlling valve independent of the pressure sensitive device to close off the steam supply and in any position of the latter.

Referring again to Fig. 1, the motor (11) and thermostatic switch (10) are connected in circuit, and to a source of electric energy designated as $L^1$ and $L^2$. The switch (10) may be either of several makes in common use for making and breaking an electric circuit on variations in temperature applied to the thermostatic bulb, or it can be an ordinary room thermostat operating through magnetic relay line contactors to operate the motor. In the latter case the hot water in the heater would be used to maintain room temperature at whatever temperature the thermostat was set, or the control valve might be used for the direct heating of the space in which the thermostat was installed, in which case the controlling valve would supply steam to radiators or other heating apparatuses.

In the embodiment illustrated in Fig. 1, high steam pressure is taken from a source of supply and reduced to what is required to maintain water temperature at the maximum temperature requirements. When the temperature exceeds the normal requirements, the thermostatically operated switch closes the electric circuit to the motor and the control valve will be closed, thus cutting off the supply of steam to the heater. If the temperature of water in the heater is dissipated by the admission of cold water, the thermostatically controlled switch (10) will break the circuit to motor (11), allowing the spring (43) to return the motor operated device to its initial biased position, and the control is then resumed from the steam pressure.

It should be understood that the motor operated device will operate in an upward, vertical direction until the controlling valve is seated, and thus closing off the steam supply from any position which the pressure sensitive device may at the time occupy.

It will now be seen that I have devised a novel combination temperature and pressure control, which is positive and efficient in operation and of comparatively low manufacturing cost. Modifications may be made by persons skilled in the art without departing from the spirit of my invention as defined in the appended claims.

I claim:—

1. In a control valve, comprising a valve casing having a controlling valve therein, a floating lever pivoted at one end to the controlling valve, a motor operated device connected to the opposite end of the floating lever and a pressure sensitive device pivoted at an intermediate position and acting as a fulcrum for the motor operated device the arrangement being such that the pressure sensitive device is rendered inoperative by the operation of the motor operated device.

2. In a control valve, comprising a valve casing having a controlling valve therein, a floating lever pivoted at one end to the controlling valve, a motor operated device operatively connected to the opposite end of said lever and a pressure sensitive device pivoted at an intermediate position and acting as a fulcrum for the motor operated device whereby the motor operated device may control the controlling valve independent of the control from the pressure sensitive device and in any position of the latter without changing the pressure adjustment of said device.

3. In a control valve, comprising a valve casing having a controlling valve therein, a floating lever pivoted at one position to the controlling valve, a motor operated device connected to a second position on the floating lever, and a pressure sensitive device pivoted at a third position on said lever, the arrangement being such that the motor operated device may control the controlling valve independent of the pressure sensitive device and in any position of the latter without changing the pressure adjustment of said device.

4. In a control valve for reduced pressure systems, comprising a valve casing having a controlling valve therein, a floating lever pivoted at one position to the controlling valve, a motor operated device connected to a second position on the floating lever and a pressure sensitive device responsive to variations in pressure in the system pivoted at a third position of said lever, means to operate said motor operated device to operate the controlling valve said operation rendering the pressure sensitive device inoperative to operate the valve from variations in pressure in the reduced pressure system and without changing the pressure adjustment of said device.

5. In a control valve for reduced pressure systems, comprising a valve casing having an inlet and an outlet for the passage of fluid or gas under pressure, a controlling valve in said casing arranged to control the flow from inlet to the outlet, a floating lever, said controlling valve being pivoted at one of three positions on said lever, a motor operated device connected to one of the other positions, and a pressure sensitive device responsive to variations in the reduced pressure system pivoted to the third position on said lever, the arrangement being such that the pressure sensitive device normally controls the pressure in the reduced pressure system but is rendered inoperative to further control the pressure upon the operation of the motor operated device which completely closes the control valve without changing the pressure adjustment of the pressure sensitive device.

6. In a hot water heating system, the combination with a heater for heating the water in the system, of a valve for supplying steam to the heater, said valve comprising a valve casing with a controlling valve therein, a floating lever operatively connected with the controlling valve, a pressure sensitive device pivoted on said lever and connected to the steam pressure supplied to the heater, and thermostatically operated means responsive to a pre-determined variation from normal of the temperature in the heating system pivoted on said lever and arranged to operate the control valve independent of the operation of the pressure device and in any position of the latter to completely close off steam to the heater and without changing the pressure setting of the pressure sensitive device.

7. In a hot water heating system, the combination with a heater for heating the water in the system, of a valve for supplying steam to the heater for heating the water, said valve comprising a valve casing having a controlling valve therein, a floating lever operatively connected with the controlling valve, a pressure sensitive device pivoted at one position on said lever and connected to the steam pressure supplied to the heater, and thermostatically operated means, responsive to a predetermined variation from normal of the temperature in the heating system, pivoted at a second position on said floating lever and arranged to operate the control valve independent of the operation of the pressure device and in any position of the latter to completely close off the steam supply to said heater and without disturbing the pressure setting of the pressure sensitive device.

8. In a hot water heating system, the combination with a heater for heating the water in the system, of a valve for supplying steam to the heater, a pressure sensitive device for operating said valve to regulate the pressure of the steam to the heater, thermostatically controlled means, operating in conjunction with the pressure sensitive device and in any position of the latter, for completely closing said valve to limit the temperature of the water in the system irrespective of the operation of the pressure sensitive device.

9. In a hot water heating system, the combination with a heater for heating the water in the system of a valve for supplying steam to the heater, a pressure sensitive device for operating said valve to regulate the pressure of the steam to the heater, thermostatically controlled means operating in conjunction with the pressure sensitive device, a lever operatively connecting the thermostatically controlled means with the valve, said lever being fulcrumed on the pressure sensitive device and operable in any position of the latter to control the valve, said operation rendering the pressure sensitive device inoperative to further control the valve but without changing the pressure setting adjustment of the pressure sensitive device.

10. In a hot water heating system, the combination with a heater for heating the water in the system of a valve for supplying steam to the heater, said valve comprising a valve casing having a controlling valve therein, a pressure responsive device mounted on said casing and connected with the pressure in the heater, a thermostatically controlled device mounted in conjunction with the pressure sensitive device, a thermostatic element connected to the hot water system and arranged to operate the thermostatically controlled device under a pre-determined rise of the temperature in the heating system, a lever operatively connecting the thermostatically controlled device with the valve, said lever being fulcrumed on the pressure sensitive device, and operable in any position of the latter, the arrangement being such that under normal operating conditions the pressure sensitive device controls the valve, but is rendered inoperative to further control the valve on a pre-determined rise of temperature in the hot water system until normal temperature conditions are restored at which time the pressure device assumes operation independent of the thermostatically controlled device.

11. In a hot water heating system, the combination with a heater for heating the water in the system, means to control a supply of steam to the heater to heat the water, comprising a valve casing having a controlling valve therein, a pressure sensitive device connected to the steam delivered by said valve to the heater, said pressure device being operatively connected to the control valve, a thermostatically controlled device operating in conjunction with the pressure device, a thermostatic element connected to the hot water system and arranged to operate the thermostatically controlled device under pre-determined rise of the temperature in the hot water system, a lever operatively connecting the thermostatically controlled device with the controlling valve, said lever being fulcrumed on the pressure device and operable in any position of the latter to completely close the controlling valve without changing the pressure adjustment setting of the pressure sensitive device, said operation rendering the pressure device temporarily inoperative to supply steam to the heater until normal temperature conditions are restored.

ARTHUR LITTLE TOBIN.